US010065647B2

(12) United States Patent
Tiwari et al.

(10) Patent No.: US 10,065,647 B2
(45) Date of Patent: Sep. 4, 2018

(54) VEHICLE CONTROL SYSTEM AND METHOD OF USE

(71) Applicant: Starsky Robotics, Inc., San Francisco, CA (US)

(72) Inventors: Kartik Tiwari, San Francisco, CA (US); Stefan Seltz-Axmacher, San Francisco, CA (US)

(73) Assignee: Starsky Robotics, Inc., San Francisco, CA (US)

( * ) Notice: Subject to any disclaimer, the term of this patent is extended or adjusted under 35 U.S.C. 154(b) by 0 days.

(21) Appl. No.: 15/825,906

(22) Filed: Nov. 29, 2017

(65) Prior Publication Data

US 2018/0154899 A1 Jun. 7, 2018

Related U.S. Application Data

(60) Provisional application No. 62/521,127, filed on Jun. 16, 2017, provisional application No. 62/429,272, filed on Dec. 2, 2016.

(51) Int. Cl.
*B60W 30/18* (2012.01)
*G05D 1/00* (2006.01)
(Continued)

(52) U.S. Cl.
CPC ...... *B60W 30/18163* (2013.01); *B60W 10/18* (2013.01); *B60W 10/20* (2013.01);
(Continued)

(58) Field of Classification Search
CPC ........... B60W 30/18163; B60W 10/18; B60W 10/20; B60W 2710/205; B60W 2710/207;
(Continued)

(56) References Cited

U.S. PATENT DOCUMENTS 5,640,323 A 6/1997 Kleimenhagen et al.
8,989,972 B2 3/2015 Anderson
(Continued)

OTHER PUBLICATIONS

Milanes Vincente; et al. Automated On-Ramp Merging System for Congested Traffic Situations, IEEE Transactions on Intelligent Transportation Systems, vol. 12, No. 2, Jun. 2011, pp. 499-508.
Diss Kathryn, Driverless trucks move all iron ore at Rio Tinto's Pilbara mines, in world first, http://www.abc.net.au/news/2015-10-18, 3 pages.

*Primary Examiner* — Gertrude Arthur Jeanglaude
(74) *Attorney, Agent, or Firm* — Jeffrey Schox; Keith Loebner

(57) ABSTRACT

A system for controlling a vehicle navigating a roadway, including a perception module that generates sensor data and outputs a cost map and traffic data associated with traffic objects, a behavior planning module that receives the cost map and the traffic data from the perception module and generates planner primitives, a training module that receives the cost map and the traffic data from the perception module, receives driver input from a vehicle operator, and trains the behavior planning module, a local planning module comprising a set of task blocks that receives the cost map from the perception module and the planner primitives from the behavior planning module, selects a task block, and generates control commands using the selected task block; and a control module comprising an actuation subsystem, wherein the control module receives the control commands from the local planning module and controls the actuation subsystem.

20 Claims, 7 Drawing Sheets

(51) Int. Cl.
  *B60W 10/20* (2006.01)
  *B60W 10/18* (2012.01)
  *G05D 1/02* (2006.01)
  *G08G 1/16* (2006.01)
  *G01C 23/00* (2006.01)

(52) U.S. Cl.
  CPC ......... *G05D 1/0088* (2013.01); *G05D 1/0212* (2013.01); *G08G 1/167* (2013.01); *B60W 2710/205* (2013.01); *B60W 2710/207* (2013.01); *G05D 2201/0213* (2013.01)

(58) Field of Classification Search
  CPC .............. G05D 1/0088; G05D 1/0212; G05D 2201/0213; G08G 1/167
  USPC ........................................ 701/23, 409, 410, 3
  See application file for complete search history.

(56) References Cited

U.S. PATENT DOCUMENTS

| | | | |
|---|---|---|---|
| 9,611,038 B2 * | 4/2017 | Dahlstrom | ............ B64C 39/024 |
| 9,630,619 B1 | 4/2017 | Kentley et al. | |
| 9,632,502 B1 | 4/2017 | Levinson et al. | |
| 9,720,410 B2 | 8/2017 | Fairfield et al. | |
| 9,720,415 B2 | 8/2017 | Levinson et al. | |
| 2014/0316614 A1 * | 10/2014 | Newman | ............ G06Q 30/0611 |
| | | | 701/3 |
| 2017/0045885 A1 | 2/2017 | Okumura et al. | |
| 2017/0120753 A1 | 5/2017 | Kentley | |
| 2017/0123422 A1 | 5/2017 | Kentley et al. | |
| 2017/0123429 A1 | 5/2017 | Levinson et al. | |

\* cited by examiner

VEHICLE CONTROL SYSTEM AND METHOD OF USE

CROSS-REFERENCE TO RELATED APPLICATIONS

This application claims the benefit of U.S. Provisional Application No. 62/521,127, filed 16 Jun. 2107, and U.S. Provisional Application No. 62/429,272, filed 2 Dec. 2016, which are hereby incorporated in their entirety by this reference.

TECHNICAL FIELD

This invention relates generally to the vehicle control field, and more specifically to new and useful decision-making and control systems and methods in the vehicle control field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
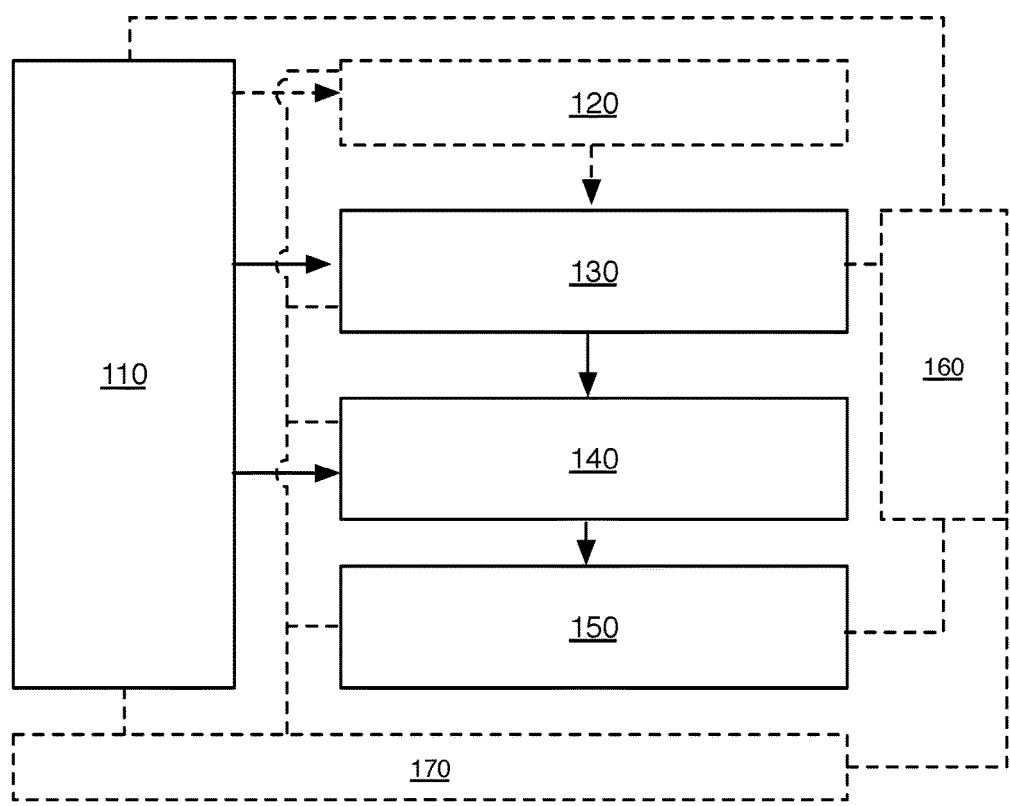
FIG. 1 is a schematic of an embodiment of a variation of the vehicle control system.

As shown in FIG. 1, the system 100 for controlling a vehicle includes a perception module 110, a behavior planning module 130 that receives input from the perception module 110, a local planning module 140 that receives input from the behavior planning module 130 and the perception module 110, and a control module 150 that receives input from the local planning module 140 and actuates control elements of the vehicle. The system 100 can optionally include a mission planning module 120 that receives input from the perception module and provides output to the behavior planning module, a training module 160 that receives inputs from the perception module and a vehicle operator and trains other module(s) and/or block(s) of the system 100 based on the inputs, a communication module 170, and/or any other suitable components.

The system 100 functions to control a vehicle during operation (e.g., driving, loading, unloading, etc.). The system can additionally or alternatively function to collect training data, and to train a decision-making model using the collected training data. The system is operable between several operating modes, including a manual operation mode, an autonomous operation mode (e.g., level four autonomy, level five autonomy, etc.), a semi-autonomous operation mode (e.g., level three autonomy, level two autonomy, etc.), and a teleoperation mode. However, the system can be operable between any other suitable operating modes. The manual operation mode preferably includes a human operator located at the vehicle (e.g., within the cab of a commercial truck at a driver's seat position, in a passenger's seat position, etc.) performing actions associated with vehicle control (e.g., actuating gas and/or brake pedals, rotating the steering wheel, selecting pre-determined task blocks, etc.), but can additionally or alternatively include any suitable operator, in any suitable location, performing any suitable actions to operate the vehicle. The autonomous operation mode preferably includes an onboard computing system receiving inputs from the sensor subsystem 111, implementing a decision-making block at the computing system to select a task block based on the inputs, and executing instructions generated by the selected task block at an actuation subsystem to control the vehicle; however, the autonomous operation mode can include performing any other suitable actions. The teleoperation mode preferably includes a remote operator transmitting control instructions (e.g., behavior guidelines, directives, etc.) to the system (e.g., to a decision making block of the system) and controlling the vehicle based on the control instructions, but can additionally or alternatively include receiving any type of directive or instructions from a remote operator (e.g., direct steering, throttle, and/or braking input signals) and controlling the vehicle in any suitable manner in response.

2. Benefits

There is a long-felt need in the autonomous and semi-autonomous vehicle control field for the generation of high quality training data for machine learning models trained by way of supervised learning. Due to the difficulty of identifying above-average (e.g., skilled) human drivers, generating high quality training data from human drivers can be impractical and costly. Also, due to the differing sensing mechanisms between a human driver and a vehicle control system (e.g., human vision vs. machine- or computer-vision, human depth perception vs. LIDAR, etc.), correlating human sensory inputs to sensory inputs of the vehicle control system in order to validate the training data (e.g., determine false positives and false negatives) can be difficult, impractical, and/or costly (e.g., require human intervention, manual validation, manual labeling, etc.). Furthermore, there is a long-felt need for a deterministic control layer between a trained decision-making model (e.g., a stochastically trained model, a model trained using supervised learning, etc.) and the actuation of the vehicle control interfaces (e.g., to facilitate post facto auditing of autonomous vehicle decision-making and/or actions).

In view of the aforementioned and for other reasons, variants of the systems and/or methods can afford several benefits and/or advantages over conventional technologies and methodologies used for controlling the operation of a vehicle, collecting training data and training a decision-making model using the training data, and/or implementing a decision-making model for controlling the operation of a vehicle.

First, variants of the system can improve the field of vehicle control technology by performing decision-making (e.g., task selection, behavior selection) according to machine-learning models (e.g., statistical models, stochastic models, supervised learning models) and performing vehicle operation tasks and/or actions (e.g., lane changing, gear shifting, braking, etc.) according to deterministic models (e.g., hard-coded models, explicitly programmed sets of rules, a set of static computer-implemented rules, etc.).

Second, variants of the system can provide technical solutions rooted in computer technology (e.g., computationally calibrating modules, such as a task block, with specialized datasets in an iterative process) to overcome issues specifically arising with the computer technology (e.g., improving accuracy of selecting task blocks based on input data from the sensor subsystem, improving selection speed, etc.). For example, a task block (e.g., for changing lanes at highway speeds) can be calibrated by comparing professional truck driver outputs (e.g., from the training module, from a teleoperator) to sensor measurements of vehicle performance.

Third, variants of the system can confer improvements to the functioning of vehicle control equipment (e.g., actuation subsystems of a vehicle control system). A decision-making block optimized for achieving vehicle operation can be used in generating task-selection instructions for controlling task blocks, which in turn can control the vehicle via actuation (e.g., steering actuation subsystem, pedal actuation subsystem, etc.) to directly operate the vehicle.

Fourth, variants of the system can generate training data (e.g., for training machine learning models) based on teleoperator input. For example, a teleoperator can select a driving task based on interpretation of received sensor data, and the selection of the teleoperator can be implemented by the system at the vehicle and recorded as training data.

Fifth, variants of the system can map structured input (e.g., lane lines extracted from imagery, surrounding vehicles and/or other objects extracted from imagery, traffic data extracted from imagery and/or range data, etc.) to structured output (e.g., driving tasks, task blocks, etc.) in addition to and/or as an alternative to precise control outputs (e.g., steering column azimuthal angles, pedal actuation distances, etc.).

Sixth, variants of the system can enhance the predictability of vehicle control and enable traceability (e.g., auditing) of decision-making processes implemented using the system.

However, the system and/or method can otherwise confer any suitable benefits.

3. System

Figure 2:
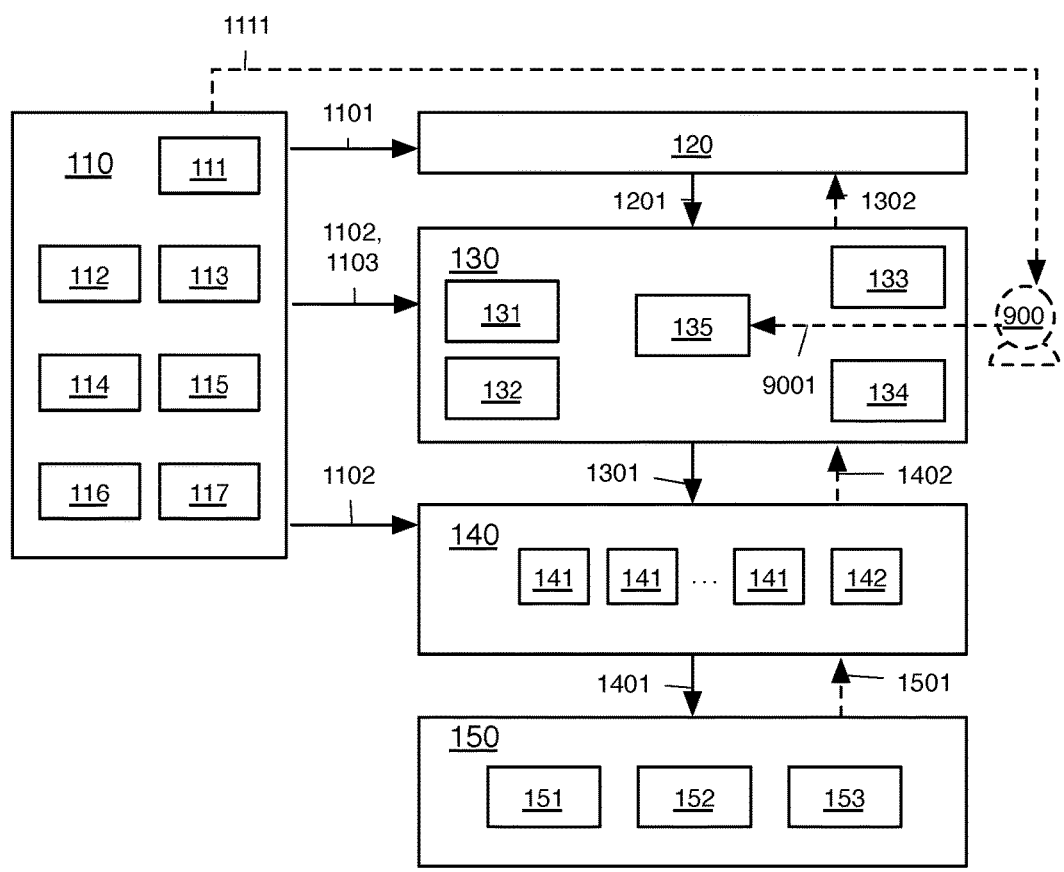
FIG. 2 is a schematic of a specific example implementation of the vehicle control system.

As shown in FIG. 2, an example of the system 100 for controlling an automotive vehicle can include: a perception module 110 including a sensor subsystem 111, a lane detection block 112, a lane tracking block 113, an object detection block 114, an object tracking block 115, a state estimation block 116, and a cost mapping block 117, wherein the perception module outputs a localization of the vehicle 1101, a cost map of the area proximal the vehicle 1102, and traffic data associated with traffic objects proximal the vehicle 1103; a mission planning module 120 that receives the localization 1101 and generates a route plan 1201 based on the localization 1101; a behavior planning module 130 including a prediction block 131, a trajectory generator 132, a finite state automator 133, a cost map updater 134, and a decision making block 135, wherein the behavior planning module 130 receives the cost map 1102 and the traffic data 1103 from the perception module 110 and the route plan 1201 from the mission planning module 120 and generates planner primitives 1301 based on the cost map 1102, traffic data 1103, and route plan 1201; a local planning module 140 including a plurality of task blocks 141 and a degenerate block 142, wherein the local planning module 140 receives the cost map 1102 from the perception module 110 and the planner primitives 1301 from the behavior planning module 130 and generates control commands 1401 based on the cost map 1102 and the planner primitives 1301; and a control module 150 including a speed control block 151, a steering control block 152, and an actuation subsystem 153, wherein the control module 150 receives the control commands 1401 from the local planning module 140 and controls the actuation subsystem 153 based on the control commands 1401. However, in variations, the system 100 can include any other suitable module(s) and/or block(s), and can generate any suitable output(s) whereby data is transferred among the module(s) and/or block(s). It shall be noted that blocks within modules can, in variations, have any suitable properties of modules of the system 100.

System modules can include any of a: process-driven module (e.g., equation based module, differential equation module, etc.), fuzzy network module, clustering module, unsupervised machine learning module (e.g., artificial neural network, association rule learning, hierarchical clustering, cluster analysis, outlier detection, convolutional neural network/CNN, etc.), supervised learning module ((e.g., artificial neural network, association rule learning, hierarchical clustering, cluster analysis, outlier detection, convolutional neural network/CNN, etc.), semi-supervised learning module, deep learning module, and/or any other suitable module leveraging any other suitable machine learning method, probabilistic approach, heuristic approach, deterministic approach, and/or any combination thereof. The inputs and/or features (e.g., parameters used in an equation, features used in a machine learning model, factors used in a CNN, etc.) used in a module can be determined through a sensitivity analysis, received from other modules (e.g., as outputs), received from a user account (e.g., from the vehicle operator, from equipment associated with a fleet manager of a set of vehicles, etc.), automatically retrieved (e.g., from an online database, received through a subscription to a data source, etc.), extracted from sampled sensor signals (e.g., images, etc.), determined from a series of sensor signals (e.g., signal changes over time, signal patterns, etc.), and/or otherwise determined.

The modules are preferably universally used (e.g., the modules implement the same models across all vehicles, fleets of vehicles, etc.), but can alternatively be specific to a driver, a vehicle, a fleet of vehicles, or otherwise differ (e.g., modules can implement models having parameters tuned to specific drivers, vehicles, fleets, geographic locations, etc.). Different instances of the method of use can be performed concurrently (e.g., in parallel), asynchronously, or at any other suitable time. Modules can be generated, executed, or calibrated every time the system is used and/or system elements are executed (e.g., based on up-to-date information), once, at a time interval (e.g., every day, week, month, etc.), every time a newly-received data value differs from a predicted data value; and/or at any other suitable frequency. Inputs and/or outputs of the modules can be associated with any suitable temporal indicator (e.g., daily data, averages over a period of time, etc.). Additionally, any suitable inputs for a module (e.g., the decision-making block) can be used as inputs for another module (e.g., the training module), and any suitable outputs of a module can be used as inputs for another module. In an example, one or more modules and/or combination of modules of the system can be a time series module (e.g., where the output of a module at a first time can be used as an input to a same or different module at a second time, etc.).

In a first variation, the decision-making block of the behavior planning module consists essentially of a trained machine-learning model, and the task block(s) of the local planning module each consist essentially of an explicitly-programmed set of rules associated with the respective tasks. The decision-making block is preferably trained by way of supervised learning, wherein the inputs to the model include the outputs of the perception module (e.g., an image stream, rangefinding data, location data, traffic data, etc.) and the output includes a desired vehicle action (e.g., associated with one or more task blocks and/or combinations of task blocks) for the vehicle to perform based on the scenario represented by the inputs. For example, the decision-making block can be trained to recognize emergency vehicles based on aural and/or visual patterns associated therewith and detectable by the perception module, and to pull over to the shoulder of the roadway when appropriate in response to recognizing such an emergency vehicle. However, in this variation, the decision-making block does not generate outputs that control the vehicle directly (e.g., command outputs, control instructions, signals for driving the actuation subsystem, etc.); instead, the task block(s) generate such outputs deterministically (e.g., as an output of the explicitly programmed sets of rules based on the inputs from the perception module). However, in further variations, the decision-making block and task block(s) can be otherwise suitably implemented in any suitable manner.

3.1 Perception Module

The perception module 110 of the system 100 functions to perceive the environment surrounding the vehicle, and output sensor data 1100 indicative of features of the surrounding environment. The perception module 110 can function to directly perceive the environment (e.g., to sample imaging sensors, rangefinding sensors, etc.) as well as to perform analysis related to perception (e.g., object detection, object classification, image feature detection, image feature tracking, traffic data extraction, etc.). The perception module 110 includes a sensor subsystem in, and can include a lane detection block 112, a lane tracking block 113, an object detection block 114, an object tracking block 115, a state estimation block 116, and a cost mapping block 117. However, the perception module 110 can additionally or alternatively include any other suitable blocks and/or subsystems for perceiving the surrounding environment.

The perception module 110 preferably outputs sensor data 1100, which can include a localization of the vehicle 1101, a cost map of the area proximal the vehicle 1102, and traffic data associated with traffic objects proximal the vehicle 1103. However, the perception module 110 can additionally or alternatively output any suitable sensor data derived from and/or otherwise related to data gathered and/or generated by the perception module 110.

The localization of the vehicle 1101 preferably includes the absolute geographic location of the vehicle (e.g., a geographic location, GPS coordinates), but can additionally or alternatively include relative distance(s) between the vehicle and objects proximal the vehicle (e.g., roadway edges, lane edges, nearest-neighbor vehicles, traffic signage, etc.), and/or any other suitable location or positional information.

The cost map of the area proximal the vehicle 1102 preferably includes a two-dimensional mapping of the physical space surrounding the vehicle to cost values, wherein the cost value of each point in space corresponds to an arbitrary cost value associated with the vehicle being located at that point in space. The cost value is preferably associated with the quantitative risk of an adverse event (e.g., collision, undesirable maneuver, violation of a traffic regulation, etc.) occurring in the event that the vehicle were to move into and/or remain at the point in space associated with the cost value. A high cost value (e.g., relative to the minimum cost value in the map area) preferably corresponds to a high risk of an adverse event, whereas a low cost value preferably corresponds to a low risk of an adverse event; however, in alternative implementations, a high cost value can correspond to a low risk of an adverse event and vice versa. A desirable trajectory through physical space preferably corresponds to a minimum integrated cost of the trajectory when mapped onto the cost map; however, in alternative implementations, a desirable trajectory through physical space can correspond to a maximum integrated cost of the trajectory. The cost value of each point in space can take on any suitable numerical value, determined from among any suitable range of values (e.g., 0 to 1, −infinity to infinity, 0 to 100, etc.).

Traffic data associated with traffic objects proximal the vehicle 1103 preferably includes data related to traffic that can be used to implement driving according to relevant laws and/or regulations. Traffic data can include data related to the roadway. For example, traffic data can include data indicative of the type of roadway (e.g., surface street, highway, loading dock, private lot, etc.), data indicative of allowed or disallowed vehicles for a roadway (e.g., data extracted from signage indicating that vehicles above a certain weight are prohibited), data indicative of traffic flow guidelines on the roadway (e.g., lane lines, words painted onto the roadway surface, signage, etc.), and any other suitable roadway data. Traffic data can include data related to objects on the roadway. For example, traffic data can include data related to nearby vehicles (e.g., number of nearby vehicles, types of nearby vehicles, operating specifications of nearby vehicles, speed and/or trajectories of nearby vehicles, etc.), data related to pedestrians (e.g., the presence of pedestrians, speed and/or trajectory of pedestrians, etc.), data related to physical traffic flow barriers (e.g., temporary barriers, traffic cones, etc.), and any other suitable data related to objects in the roadway. Traffic data can include any data regarding the traffic environment that can be used to abide by local and/or state driving regulations. In another example, the traffic data can include a set of positions and/or a set of trajectories associated with a set of traffic objects (e.g., a neighboring vehicle, a lane marking, a roadway edge, etc.) that are classified by an object analysis block (e.g., object detection block, object tracking block) of the perception module. However, traffic data can additionally or alternatively include any suitable data related to vehicular traffic and/or the vehicular traffic environs (e.g., adjacent pedestrian byways).

The sensor subsystem in of the perception module 110 functions to collect localization data and mapping data from vehicle surroundings. The sensor subsystem 111 can additionally function to collect vehicle operation data (e.g., time series data corresponding to the state of vehicle components during operation), and to record measurements indicative of the driving context (e.g., ambient environment parameters, vehicle location, etc.) and provide outputs (e.g., recorded measurements, processed sensor data, etc.) to the decision-making block (e.g., as signals, messages, etc.) of the behavior planning module 130 and any other suitable block(s) of other module(s) of the system 100. The sensor system includes at least one mapping sensor and at least one monitoring sensor, but can additionally or alternatively include any suitable number of any suitable sensors. The sensor subsystem in preferably gathers the sensor data, such as image data (e.g., still images, video streams, compressed image sequences, etc.), range data (e.g., time-of-flight/ToF data, LIDAR data, radar data, stereocamera data, optical flow data, point cloud data, etc.), environmental data (e.g., position data, temperature data, humidity data, etc.), and any other suitable sensor data. Inputs (e.g., gathered by the sensor subsystem) are preferably received from one or more sensors, which can be on-board the vehicle, removed from the vehicle (e.g., remote), or in any other suitable location. Outputs of the sensor subsystem 111 can include the sensor data (e.g., raw data, unprocessed digitized image data, etc.), as well as data derived from the sensor data, such as fused data (e.g., image and range data that has been combined at a processor to increase accuracy), otherwise processed data (e.g., classified objects, position of object center-of-mass/ CoM, object extent in three- or two-dimensional space, object trajectory, etc.), and any other suitable data. Outputs are preferably provided to the decision-making block; exemplary sensor measurements provided to the decision-making block include visual markers on the roadway, navigation data (e.g., map position data, GPS data), RADAR data, orientation sensor data, ambient environmental data (e.g., acoustic data, temperature data, etc.), and any other suitable sensor data.

Examples of sensors and/or data sources on-board the vehicle include: an inertial measurement unit (IMU), ultrasonic sensors, a data port (e.g., on-board diagnostic module port/OBD port), GPS sensor(s) and modules, cameras (e.g., stereoscopic cameras, single lens cameras, etc.), navigation sensors (e.g., LiDAR, radar, ToF, etc.), position sensors (e.g., actuator position sensors, LVDT sensors, etc.), encoders (e.g., rotary encoders that measure the angular position and/or velocity of rotary actuators of the vehicle and/or vehicle control systems), and any other suitable on-board sensors. The aforementioned sensors of the sensor subsystem 111 can additionally or alternatively be located remote from the vehicle (e.g., a stationary roadside sensor, a traffic camera, etc.) and transmit sensor data to the vehicle.

Sensor data can be pre-processed by the sensor subsystem in and/or computing systems in communication with the sensor subsystem 111, prior to provision to the decision-making block and/or other modules of the vehicle control system. Pre-processing can be performed on camera data, GPS data, radar and/or other range data, and any other suitable data. For example, camera data (e.g., images) can be processed to extract lane markings, vehicle objects, visual landmarks (e.g., stop signs, pedestrian crossing signs, buildings, etc.), and any other suitable features. In another example, GPS coordinates can be combined with a map of the vehicle route (e.g., retrieved from a remote server, stored in an onboard database, etc.) to provide navigation data. In another example, radar signatures (e.g., point cloud data) are reduced to trajectories of vehicles in the field of view (FoV) including the velocity and range of the vehicles.

Mapping sensors of the sensor subsystem 111 function to autonomously map and/or localize the vehicle in three-dimensional space relative to the surroundings of the vehicle. Mapping sensors can also function to detect and/or track moving objects that are proximal the vehicle (e.g., on or near the same roadway as the vehicle). Mapping sensors can include, for example: radar, LiDAR, cameras (e.g., stereo cameras, monocular cameras), and any other suitable mapping sensors. However, the mapping sensors can include any other suitable sensors and be otherwise suitably arranged.

Monitoring sensors of the sensor subsystem in function to monitor control inputs being applied to the vehicle (e.g., by a driver located in the vehicle, by a teleoperator, by an autonomous computing system, etc.). Monitoring sensors can include, for example: driver-facing cameras, pressure sensors and/or other force sensors that measure force applied to vehicle control surfaces (e.g., steering wheel, pedals, etc.), and any other suitable monitoring sensors.

The lane detection block 112 of the perception module 110 functions to extract information from the raw sensor data gathered by sensors of the sensor subsystem in indicative of traffic lanes on the roadway. For example, the lane detection block 112 can extract fiducial information (e.g., lane lines) from an image of the roadway and compute the relative spatial orientation between the vehicle and the detected lane, and the perception module 110 can output the relative spatial orientation as traffic data and superimpose the fiducial markings of the lane at a display of a remote operator interface. In another example, the lane detection block 112 can extract a lane edge from a vibration signal of an inertial measurement unit of the sensor subsystem 111, wherein the vibration signal is characteristic of a morphological roadway feature that indicates a lane edge. However, the lane detection block 112 can additionally or alternatively detect a lane in any suitable manner based on any suitable information.

The lane tracking block 113 of the perception module 110 functions to track the position(s) of lane(s) on the roadway, and to track the bounds of the lane for lane-keeping purposes. For example, the lane tracking block 113 can project the continuous outline of the lane in time and space (e.g., toward the horizon in front of the vehicle) based on individual lane markings (e.g., discontinuous lane markings) extracted from images by the lane detection block 112. However, the lane tracking block 113 can otherwise suitably track any suitable properties of lane(s) on the roadway.

The object detection block 114 of the perception module 110 functions to detect objects proximal the vehicle based on the sensor data gathered by the sensor subsystem. Such objects can include neighboring vehicles (e.g., vehicles within one vehicle-length of the vehicle, vehicles within sensor range of the sensor subsystem, etc.), static objects (e.g., road signs, sound-suppression walls, center dividers, etc.), and any other physical objects nearby the vehicle. The object detection block 114 can detect (e.g., identify the existence of) the objects, classify (e.g., determine the type of) the objects, and perform any other suitable analysis related to the objects.

The object tracking block 115 of the perception module 110 functions to track the position(s) versus time of any of the object(s) detected by the object detection block 114. For example, the object tracking block can determine the previous locations of a neighboring vehicle and project the future position of the neighboring vehicle based on a physical kinematic model and the output of the object detection block (e.g., the position and extent of the neighboring vehicle at each time point). However, the object tracking block can otherwise suitably track any suitable properties of any suitable objects, in any suitable manner.

The state estimation block 116 of the perception module 110 functions to determine the state (e.g., output) of each of the blocks (e.g., 112, 113, 114, 115, 117) of the perception module 110 at any suitable time, independently of the temporal rate at which data is gathered by the sensor subsystem 111. For example, if the sensor subsystem in gathers data at 20 Hz, and the output of the object tracking block is required by a downstream module or block at 40 Hz, the state estimation block 116 can up-sample the output of the object tracking block by projecting the position(s) of detected objects based on previous output(s) (e.g., the most recent three positions of detected objects). However, the state estimation block can otherwise suitably estimate the state(s) of any suitable blocks or other elements of the perception module 110.

The cost mapping block 117 of the perception module 110 functions to generate the cost map 1102 based on output(s) of other block(s) of the perception module 110. In some variations, the cost mapping block 117 can generate the cost map 1102 based on predetermined cost distributions associated with object types. For example, the cost distribution associated with an object recognized as a passenger vehicle by the object detection block can have a predetermined peak value assigned to the physical extent of the vehicle, and a cost value associated with the space surrounding the passenger vehicle that decreases radially (e.g., with $1/r$, $1/r^2$, etc.) from the edge of the physical extent of the vehicle. In another example, the cost distribution associated with an object recognized as a heavy duty vehicle (e.g., having a greater stopping distance and lower maneuverability than a passenger vehicle) can be weighted such that the regions to the front of and/or the sides of the heavy duty vehicle correspond to high-cost regions. In additional or alternative variations, the cost mapping block 117 can generate the cost map 1102 based on dynamic scenarios observed by the perception module 110. For example, the perception module no can determine that a detected and tracked object is moving erratically, and accordingly assign high cost values to the region(s) proximal the erratically-moving object. However, the cost mapping block 117 can otherwise suitably generate the cost map 1102 based on any suitable output(s) of block(s) of the perception module no, and/or any other suitable sensor data.

In one variation, the cost mapping block generates the cost map based on an analysis of sensor data received from the perception module. The cost map in this variation includes a two-dimensional mapping of a set of weights to an associated set of positions on the roadway. Each weight of the set of weights corresponds to a risk value (e.g., a quantitative likelihood, a categorical likelihood of a set of ordered likelihoods such as high, medium, and low, etc.) that an adverse event can occur in the event that the vehicle were to be located at the associated position. However, the cost map can be otherwise suitably generated by the cost mapping block in additional or alternative variations.

3.2 Mission Planning Module

The system can include a mission planning module 120, which functions to define a route between an origin and destination and guide the vehicle along the route during operation. The origin can be the current position of the vehicle, the past position of the vehicle, the last position of the vehicle before the vehicle began moving, and/or any other suitable geographic location of the vehicle. The destination is preferably the desired end point of the vehicle, and can be received (e.g., from a teleoperator), generated (e.g., by the mission planning module itself), or otherwise suitably obtained.

The mission planning module 120 preferably outputs a route plan 1201. The route plan 1201 preferably includes a sequence of driving behaviors (e.g., highway entrances, highway driving, highway exits, surface street navigation actions, etc.) required to navigate the vehicle between the origin and the destination. The mission planning module 120 preferably updates the route plan 1201 (e.g., continuously updates the vehicle position along the route plan) based on the localization signal 1101 (e.g., received by the mission planning module from the perception module); additionally or alternatively, the mission planning module 120 can otherwise suitably generate and/or modify the route plan 1201 based on any suitable information. The route plan 1201 can include graphical indicators (e.g., arrows, street and/or exit names or numbers, etc.) that can in turn be provided at a teleoperation interface (e.g., rendered at a heads-up display of a remote operator). However, the mission planning module can additionally or alternatively provide any suitable output in any suitable manner.

In one variation, the mission planning module receives a geographic location from the perception module no and generates a route plan based on the geographic location and a predetermined destination. The predetermined destination can be entered manually by a vehicle operator and/or automatically determined (e.g., by reading a destination tag attached to vehicle cargo), or otherwise suitably determined.

3.3 Behavior Planning Module

The behavior planning module 130 functions to plan the vehicle behavior based on output(s) of the perception module 110. The behavior planning module 130 can also function to plan the vehicle behavior based on the route plan 1201 received from the mission planning module. The behavior planning module 130 can also function to plan the vehicle behavior based on instruction(s) received from a remote operator (e.g., a teleoperator). The behavior planning module 130 can also function to generate an error output and/or failure flag 1302 (e.g., based on a received error output 1402 from the local planning module 140), and to provide the error output 1302 to the mission planning module 120 and/or teleoperator 900, so that further decision making can be performed.

The behavior planning module 130 includes a decision-making block 135, and can include a prediction block 131, a trajectory generator 132, a finite state automator 133, and a cost map updater 134. The behavior planning module 130 and associated blocks are preferably implemented at least in part at a local computing system (e.g., residing at the vehicle) and at least in part at a remote computing system (e.g., a remote operation system or teleoperation system communicatively linked to the vehicle), but can additionally or alternatively be implemented entirely locally, entirely remotely, or with any suitable distribution between local and remote computing resources.

The behavior planning module 130 preferably receives the cost map 1102 and the traffic data 1103 from the perception module 110 and the route plan 1201 from the mission planning module 120 and generates planner primitives 1301 based on the cost map 1102, traffic data 1103, and route plan 1201. In an alternative variation, the behavior planning module 130 receives the cost map 1102 and traffic data 1103 from the perception module 110, and a directive from a remote operator (e.g., received at the decision-making block 135) and generates planner primitives 1301 based on the cost map 1102, traffic data 1103, and the directive. In another variation, the behavior planning module generates the planner primitives based on output of the prediction block, which includes estimated future positions of nearby traffic objects. However, the behavior planning module can additionally or alternatively receive any suitable inputs from any other modules of the system 100, and generate any suitable outputs in any suitable manner.

The planner primitives 1301 are preferably high-level instructions that semantically describe the desired vehicle behavior. For example, the planner primitives 1301 can include instructions to stay within the current lane on the roadway (e.g., a lane keeping primitive), instructions to hold the present speed (e.g., a maintain-state primitive), instructions to change lanes (e.g., a lane-change primitive), and any other suitable high-level instructions. The planner primitives 1301 are preferably generated by the decision-making block 135 and can incorporate inputs from other block(s) of the behavior planning module 130 and/or can be based at least in part on the cost map 11-2. traffic data 1103, and route plan 1201, either directly or indirectly. However, the planner primitives 1301 can additionally or alternatively include low-level instructions (e.g., analog signals suitable for operating actuators, detailed instructions for operation that include specific distances, angles, and time periods, etc.) and/or any other suitable output(s) of the behavior planning module 130.

The decision-making block 135 functions to determine a task block to execute, based on inputs. The decision-making block can also function to select a vehicle action from a set of available vehicle actions (e.g., as defined by task blocks) based on received measurements. The decision-making block can be executed at an on-board computing system (e.g., on the vehicle), at a remote computing system (e.g., a teleoperation system), or at any other suitable location. In cases wherein the decision-making block executes at a remote computing system, sensor streams from the sensor subsystem 111 are preferably streamed to the remote computing system in real- or near-real time. In some variations, a first version of the decision-making block executes at a vehicle computing system, and a second version of the decision-making block executes at a remote computing system, wherein the first and second versions can execute the same and/or different processes (e.g., complimentary, different instances, etc.). In a first variation, low-level data is streamed to the remote computing system (e.g., video data, audio data, steering actuation assembly encoder data, data indicative of a force applied to the accelerator pedal, etc.), and the decision-making block at the remote computing system automatically selects a task block based on the low-level data. In a second variation, a subset of sensor data is streamed to a teleoperation system (e.g., video data, audio data, etc.) and the teleoperator manually selects a task block in response to the received subset of sensor data. In a third variation, processed data (e.g., sampled measurement summaries, compressed images, etc.) can be sent to the teleoperation system for teleoperator monitoring, while the underlying data is used by an on-board system to control a subset of vehicle actions. The teleoperator can select vehicle actions based on the processed data (e.g., covering the same or different type of vehicle action as that determined by the on-board system), wherein the selected vehicle actions (e.g., identifiers, instructions, etc.) can be sent to the vehicle and subsequently performed by the on-board system.

The decision-making block is preferably implemented as an artificial neural network (e.g., a recursive neural network/ RNN, CNN, a Boltzman machine, an auto-encoder, a deep stacking network, etc.); however, the decision-making block can additionally or alternatively be implemented as a deterministic module (e.g., a predetermined set of rules that can be deterministically applied to inputs to produce a task block as an output), a probabilistic module (e.g., a Monte-Carlo stochastic simulator that selects a task block based on the most probable favorable outcome of a set of inputs), or any other suitable implementation.

The decision-making block can receive various inputs from other system components and/or related entities. In a first variation, the decision-making block receives sensor inputs from the sensor subsystem in (e.g., sensor data as described above). In a second variation, the decision-making block receives operator inputs. Operator inputs can include, for example, inputs by a teleoperator, inputs by a local operator (e.g., the driver turning the steering wheel, depressing the brake pedal, activating the turn signal, etc.), or any other suitable inputs by a human entity, local or remote. In a first specific example, a local operator provides inputs that bypass the decision-making block and directly control the vehicle. In a second specific example, the local operator provides inputs that are mapped to an associated task block (e.g., using a deterministic map, a lookup table, etc.), wherein the associated task is automatically performed by the system (e.g., by executing an associated task block). In a third variation, the decision-making block receives inputs from the actuation subsystem inputs (e.g., outputs of state sensors of the actuation subsystem). In the third variation, the actuation subsystem can be controlled by a teleoperator and thus the inputs received by the decision-making block can be indirectly received from the teleoperator (e.g., for use as training data for the decision-making block); additionally or alternatively, the actuation subsystem can be controlled in any other suitable manner. However, the decision-making block can receive any other suitable inputs.

The decision-making block can generate various outputs for use by other system components and/or related entities. The decision-making block preferably determines a task block to execute based on received inputs (e.g., inputs such as those described above), but can otherwise suitably generate and/or determine outputs. Outputs of the decision-making block can include, for example: direct vehicle control instructions (e.g., voltages and/or currents to supply to the actuation subsystem), a selected task block (e.g., wherein the task block codifies a set of instructions to change from the current lane to a lane to the left of the vehicle), a set of selected task blocks (e.g., wherein the task blocks codify a set of instructions to change lanes to the right and to engine brake), input parameters for a task block or set of task blocks (e.g., a target speed in miles-per-hour, the last-known position of objects in the immediate vicinity of the vehicle, etc.), any suitable combination of the aforementioned outputs, or any other suitable outputs.

In a first variation, determination of a task block by the decision-making block includes selecting one of a set of task blocks (e.g., a set including an acceleration module, a deceleration module, a speed-maintenance module, etc.). In a second variation, determining a task block includes selecting a combination of task blocks (e.g., a lane-change and an acceleration module, a lane-keeping and a speed-maintenance module, an emergency braking module and hazard-light-activation module, etc.). In a third variation, determining a task block includes generating and/or modifying a task block (e.g., automatically generating a list of executable instructions to accomplish a vehicle operation task).

The prediction block 131 of the behavior planning module 130 functions to predict the likelihood of occurrence of events that may affect vehicle behavior and/or desired vehicle behavior, and provide the predicted likelihood to the decision-making block for incorporation into the determination of decision-making block output (e.g., planner primitives). For example, the prediction block 131 can predict the likelihood that a moving object (e.g., vehicle) ahead of the vehicle will slow down, based on observing brake lights (e.g., whether or not brake lights of the object or around the object are activated) in imagery data gathered by the sensor subsystem in, and can provide the prediction to the decision-making block 135. The prediction block 131 can predict trajectories, positions, speeds, and any other suitable properties of any detected objects in the area surrounding the vehicle. The prediction block 131 can predict the future state of roadway surfaces, roadway morphology (e.g., bank angle, curve radius, etc.), and any other suitable properties of the road on which the vehicle is operating. The prediction block 131 is preferably implemented as a deterministic model, but can additionally or alternatively include trained models (e.g., machine-learning models trained via supervised learning) and any other suitable models for implementing prediction based on input(s) from the perception module 110 and/or other system modules and/or blocks. The likelihood that is output by the prediction block is preferably a quantitative likelihood that enables the statistical expectation of the event occurrence to be incorporated into the decision-making process as an input; however, the likelihood can additionally or alternatively be a binary likelihood, a qualitative likelihood (e.g., a warning), and/or be of any other suitable format.

In one variation, the prediction block estimates future positions of traffic objects relative to the vehicle, based on computed trajectories of the traffic objects as well as, in some examples, other traffic data.

The trajectory generator 132 of the behavior planning module 130 functions to determine the desired trajectory for the vehicle to use to traverse the physical space surrounding the vehicle at an optimal cost (e.g., minimum cost, maximum cost, etc.). The trajectory generator 131 can also function to determine a set of potential trajectories that can be used to traverse the physical space surrounding the vehicle, each of the set of potential trajectories having an associated integrated cost (e.g., a sum of costs associated with each point along the trajectory by the cost map). The trajectory generator 132 preferably generates one or more trajectories as output(s), and provides the one or more trajectories to the decision-making block 135. The generated trajectories can be two-dimensional trajectories plotted from the current position of the vehicle to a desired future position of the vehicle, wherein the distance between the current position and the future position is determined based on the speed of the vehicle and the rate (e.g., frequency) at which the system module(s) and/or block(s) are executed. For example, a generated trajectory can correspond to the path designated for the vehicle to follow over the next 5 seconds, 15 seconds, 60 seconds, and any other suitable time period. Proximal in time (e.g., coincident with, contemporaneously with, within 1 second of, etc.) the end of the time period corresponding to the completion of travel via the generated trajectory, a new trajectory can be generated by the trajectory generator 132. However, the trajectory generator 132 can additionally or alternatively generate one or more trajectories in any suitable manner.

The finite state automator 133 of the behavior planning module 130 functions to determine which behaviors are allowed and disallowed given the environment perceived by the perception module 110 (e.g., based on sensor data from the perception module). In variations, the set of potential vehicle actions (e.g., lane changing, highway exiting, highway entering, etc.) can be reduced by excluding one or more potential vehicle actions from the set based on a determination (e.g., including outputs of the perception module) that the excluded potential vehicle actions are not possible. For example, the vehicle action of lane changing can be excluded based on outputs of the lane detection and/or lane tracking blocks that indicate only a single lane is available for traffic moving in the direction of vehicle movement. In another example, the vehicle actin of highway exiting can be excluded based on a determination that no highway exit is present proximal (e.g., within 5 vehicle-lengths of, within 10 vehicle-lengths of, etc.) the vehicle. This limited set of potential vehicle actions (e.g., finite set of states) is preferably provided to the decision-making block, which in turn determines which action(s) is/are appropriate. Thus, the finite state automator 133 can act to limit the available behaviors that can be determined by the decision-making block and thereby avoid the selection or other determination of unsuitable behaviors and/or actions by the behavior planning module 130.

The cost map updater 134 of the behavior planning module 130 functions to update the cost map 1102 based on outputs of other block(s) of the behavior planning module 130 (e.g., 131, 132, 133, 135). Updating the cost map can include reweighting the cost associated with each point in space based on outputs received and/or generated by block(s) and/or other portions of the behavior planning module 130. For example, a teleoperator can label a nearby vehicle as an "erratic" vehicle and transmit the label to the behavior planning module (e.g., in the form of a directive to avoid the vehicle), and in response the cost map updater can increase the cost associated with the area(s) surrounding the labeled vehicle (e.g., in real-time, in substantially real time, etc.). In another example, the finite state automator can determine that the roadway is a two-lane roadway, with a single lane corresponding to each traffic direction, and the cost map updater can incorporate that determination into an updated cost map that reflects a high cost (e.g., maximum cost) associated with the area of the opposing-traffic lane. However, the cost map updater 134 can additionally or alternatively update the cost map in any suitable manner, based on any suitable input(s), output(s), and/or other information.

3.4 Local Planning Module

The local planning module 140 functions to translate planning primitives 1301 received from the behavior planning module 130, in combination with the cost map 1102 received from the perception module 110, into low level instructions for interpretation and execution by the control module 150.

The local planning module 140 includes a plurality of task blocks 141, and can include a degenerate block 142. The local planning module 140 is preferably located entirely at the vehicle, and is preferably implemented at least in part at a local computing subsystem (e.g., an application-specific integrated circuit, a GPU, a CPU, a microcontroller, a mobile device residing at the vehicle, etc.). However, the local planning module 140 can be otherwise suitably located and/or implemented.

The local planning module 140 preferably receives the cost map 1102 from the perception module 110 and the planner primitives 1301 from the behavior planning module 130 and generates control commands 1401 based on the cost map 1102 and the planner primitives 1301. However, the local planning module 140 can additionally or alternatively receive any suitable inputs from any suitable block(s) and/or module(s) of the system 100, and accordingly generate any suitable outputs.

The task blocks function to perform a predefined task (e.g., by generating control outputs that can be used to control the actuation subsystem). Each task block is preferably associated with a single, discrete vehicle action or task (e.g., lane keeping, left lane change, right lane change, turning right, exiting the highway, turning left, entering the highway, engine braking, friction/pedal braking, etc.), but can additionally or alternatively be associated with multiple vehicle actions or any other suitable vehicle behaviors. Additionally or alternatively, each vehicle action can be performed by one or more task blocks (e.g., operating concurrently, in series, based on a prior task block's output, etc.). Vehicle actions or tasks associated with each module preferably include a set of deterministic vehicle control algorithms (and/or rule-based control algorithms), but can be otherwise suitably defined and/or implemented. The set of task blocks preferably receive the outputs of the decision-making block, as described above, as inputs, but can otherwise receive any suitable inputs. For example, the set of task blocks can receive a selection of one of the set of task blocks, a set of instructions, sensor outputs (e.g., motor operation parameters, wheel encoder data, images recorded by cameras of the sensor subsystem, etc.). Alternatively, the set of task blocks can receive inputs from a teleoperator (e.g., a single individual teleoperating multiple vehicles, a fly-by-wire system, etc.), a local operator (e.g., a driver of the vehicle activating a selected task block manually), or any other suitable entity. Each task block can generate an output or set of outputs associated with the task codified by the task block; for example, the task block can generate control instructions and/or control signals for control of the actuation subsystem. The outputs are preferably signals suitable for driving components of the actuation subsystem (e.g., having sufficient voltage, current, power, and the like to operate components of the actuation subsystem such as motors, linear actuators, and the like), but can additionally or alternatively be instructions to operate integrated driver components of the actuation subsystem (e.g., an integrated motor controller/driver, an integrated pneumatic controller for a linear actuator, etc.) that are supplied to the actuation subsystem for execution. However, the task blocks can generate any other suitable outputs.

In one variation, each of the task blocks includes an explicitly-programmed set of rules. The task blocks can include only the rule set (e.g., consist essentially of the rule set), or include other rules. The rules can be deterministic, probabilistic, or have any other suitable computation. In a specific example, each task block is a deterministic finite state machine. In a second specific example, each task block includes a set of deterministic equations. However, the task blocks can be otherwise structured. The local planning module, in this variation, receives the cost map 1102 from the perception module 110 and the planner primitives 1301 from the behavior planning module 130, selects a task block from a set of task blocks based on the planner primitives 1301, and generates low level instructions (e.g., control commands 1401) using the selected task block, wherein the task block receives the cost map 1101 as an input. However, the task blocks can be otherwise structured.

The degenerate block 142 functions to determine that an error has occurred at the control module, based on an output received therefrom (e.g., a failure flag). The degenerate block 142 can also function to generate an error output and/or failure flag 1402 to provide to the behavior planning module 130 (e.g., based on a received failure flag 1501), so that the decision-making block 135 can determine a suitable course of action based on the error.

3.5 Control Module

The control module 150 functions to directly control the control elements of the vehicle (e.g., throttle, steering, etc.) based on the control commands 1401 received from the local planning module 140. The control module 150 can also function to perform any suitable control action in relation to the vehicle (e.g., to unlock the vehicle, to lock the vehicle, to actuate any actuator of the vehicle, etc.). The control module 150 can also function to generate a failure flag 1501, in response to the unsuccessful execution of a control instruction by one or more elements of the actuation subsystem 153.

The control module 150 includes an actuation subsystem 153, and can include a speed control block 151, a steering control block 152, a transmission control block, and any other suitable control blocks (e.g., for control of any actively controllable vehicle component).

The control module 150 preferably receives the control commands 1401 from the local planning module 140 and controls the actuation subsystem 153 based on the control commands 1401. However, the control module 150 can additionally or alternatively receive any suitable inputs from any suitable block(s) or module(s) of the system 100, and control the actuation subsystem 153 (and thereby the vehicle itself) in any other suitable manner. In one variation, the control module 150 includes an action subsystem 153 that is controlled by a microcontroller of the control module based on the control commands (e.g., which are interpreted by the microcontroller).

The speed control block 151 functions to generate a speed control signal that is provided to the actuation subsystem 153 and results in control of the speed of the vehicle. The speed control signal can be an analog signal (e.g., an analog signal adapted to drive an electric motor), a digital signal (e.g., a signal adapted to drive a relay or transistor), a data signal (e.g., a signal adapted to be interpreted by a microcontroller or specialized chip to drive an electromechanical device), and/or any other suitable signal.

The steering control block 152 functions to generate a steering control signal that is provided to the actuation subsystem 153 and results in control of the steering angle (and thereby the heading, directly or indirectly) of the vehicle. The steering control signal can be an analog signal (e.g., an analog signal adapted to drive an electric motor), a digital signal (e.g., a signal adapted to drive a relay or transistor), a data signal (e.g., a signal adapted to be interpreted by a microcontroller or specialized chip to drive an electromechanical device), and/or any other suitable signal.

The transmission control block functions to control the gearing of the transmission of the vehicle, and to enable selection of the operating gear (e.g., first gear, second gear, reverse, etc.) of the vehicle. The transmission control block can function to generate a transmission control signal that enables the actuation subsystem 153 to switch between vehicle gears to the chosen gear. The transmission control block can be used in conjunction with the speed control block (e.g., by way of engine-braking and/or downshifting) to control vehicle speed, or otherwise suitably used.

The actuation subsystem 153 functions to actuate the control interfaces of the vehicle. The actuation subsystem can also function to execute a selected vehicle action (e.g., the instructions defined by a task block). Control interfaces actuated by the actuation subsystem can include human-oriented control interfaces, computer control interfaces, and any other suitable control interfaces. Human-oriented control interfaces can include, for example, a steering wheel, pedals (e.g., clutch pedal, gas pedal, brake pedal, etc.), a shifter (e.g., shift lever, shift paddle, etc.), and any other suitable control mechanism configured for operation by a human. Computer control interfaces can include, for example, a throttle actuation interface (e.g., a controllable fuel flow rate regulator), a brake actuation interface (e.g., redundant brake calipers, electronic control mechanism for existing brakes, etc.), a transmission actuation interface (e.g., an electronically-controllable automatic transmission), and any other suitable control interface configured to receive control instructions from a computing system. The actuation subsystem preferably includes a steering actuation assembly and a pedal actuation assembly, but can additionally or alternatively include any suitable actuation mechanism.

The actuation subsystem can receive inputs, including control instructions and/or operator inputs. Control instructions are preferably received from control blocks (e.g., the speed control, steering control, and/or transmission control blocks), and can include voltage levels, current levels, time-varying signals, constant signals, trigger- and/or event-based signals, and any other suitable instructions and/or parameters that can effect an output of the actuation subsystem (e.g., an actuation of a control interface by the actuation subsystem). Operator inputs are preferably received from an operator (e.g., a driver in the vehicle, a teleoperator, etc.), and can include a human moving the steering wheel by hand, a human depressing a pedal manually, a transmission from a teleoperator including instructions to actuate a portion of the actuation subsystem, and any other suitable inputs from an operator.

The actuation subsystem can provide outputs, including state data indicative of the state of actuators of the actuation subsystem. For example, the actuation subsystem can provide one or more signals with amplitude values proportional to a force applied by actuators to control interfaces of the vehicle (e.g., the torque applied by a motor of a steering wheel actuator of the actuation subsystem, the force applied by a pedal actuator of the actuation subsystem, etc.). In another example, the actuation subsystem can provide outputs indicative of force applied by a human to control interfaces (e.g., torque applied to a steering wheel by a human operator, force applied to a pedal by a human operator, etc.). These outputs can transition the system between operation modes (e.g., switch system operation from an autonomous operation mode to a manual operation mode), select a task block (e.g., associated with the output type, value, etc.), or be otherwise used. In related examples, the actuation subsystem can provide outputs indicative of whether the actuation subsystem (or portions thereof) are powered "on" or "off" (e.g., an indicator LED that emits light when the actuation subsystem is powered "on"), whether actuators of the actuation subsystem are mechanically engaged with or disengaged from vehicle control interfaces, and any other suitable states and/or configurations of the actuation subsystems and/or portions thereof.

Figure 5:
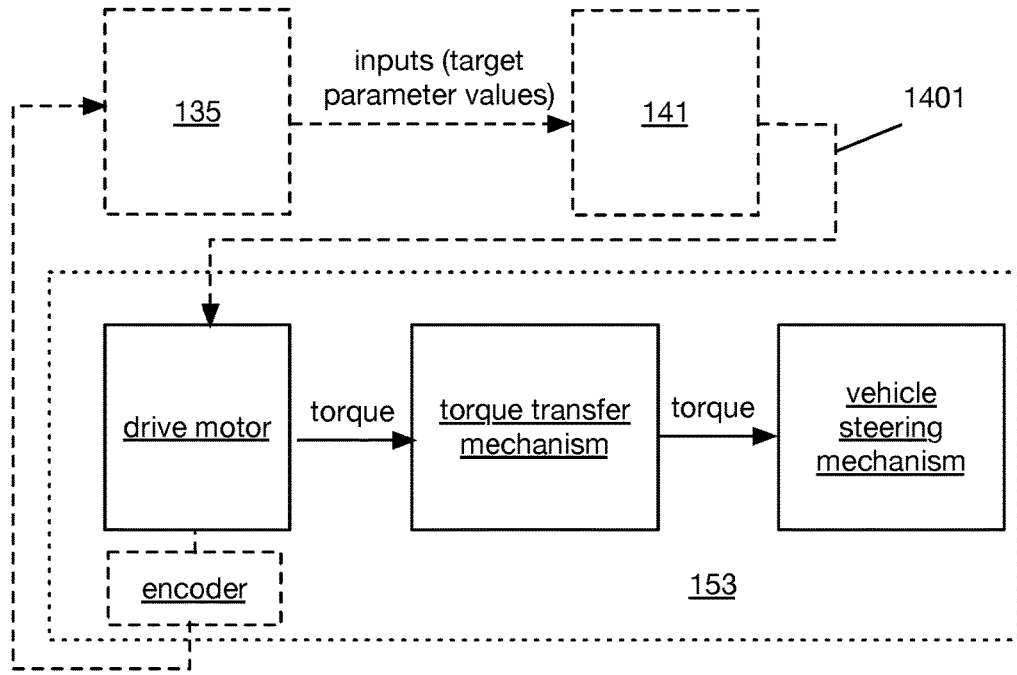
FIG. 5 is a schematic of an example of a portion of an actuation subsystem of the vehicle control system, and flow chart of a portion of a variation of a method of use thereof.

As shown in FIG. 5, a specific example of the steering actuation assembly of the actuation subsystem includes a drive motor, a torque transfer mechanism, and an encoder. The drive motor functions to generate a torque that can be used to mechanically rotate the rotating portion of the steering column. The torque transfer mechanism includes a drive gear and a driven gear, wherein the drive gear receives the torque generated by the drive motor and transfers it to driven gear, which is fixed to the steering wheel and is rotated by the drive gear, thus rotating the steering wheel. The encoder functions to monitor the output of the steering actuation assembly (e.g., the angular position of the drive motor shaft, the angular position of the steering wheel, the rate of rotation of the drive motor and/or steering wheel, etc.). However, the steering actuation assembly can have any other suitable components that have any suitable functionality directed to steering column actuation.

Figure 6:
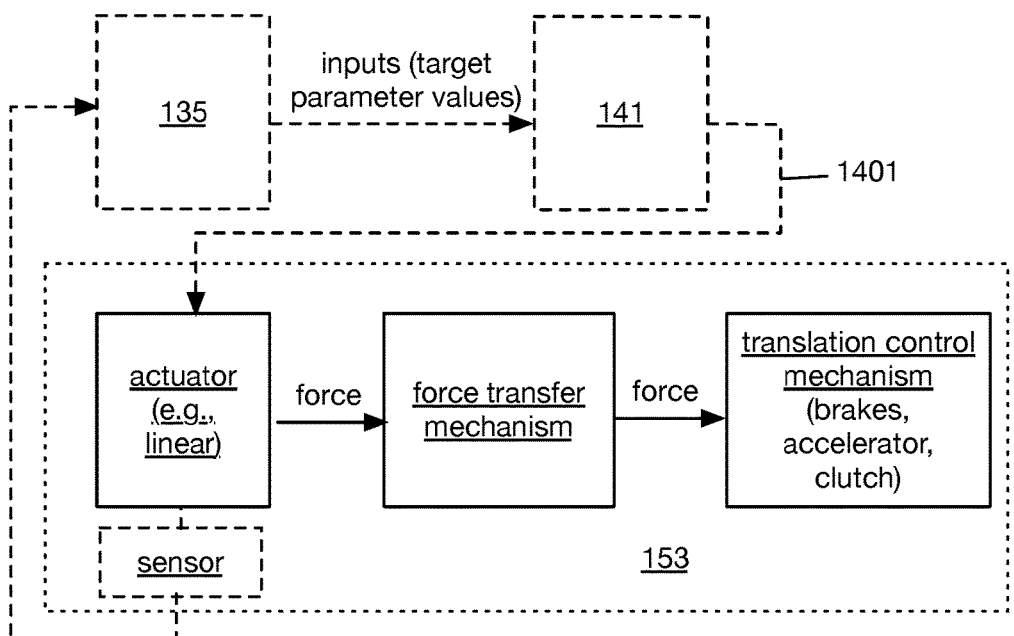
FIG. 6 is a schematic of an example of a portion of an actuation subsystem of the vehicle control system, and flow chart of a portion of a variation of a method of use thereof.

As shown in FIG. 6, a specific example of the translation actuation assembly of the actuation subsystem includes an actuator and a force transfer mechanism, and can optionally include a release mechanism. The actuator functions to displace the vehicle translation control mechanism (e.g., pedal, throttle) in order to control the vehicle component associated with the pedal (e.g., to brake the vehicle, to accelerate the vehicle, to shift the gears of the vehicle, etc.). The force transfer mechanism functions to transmit force applied to the force transfer mechanism (e.g., by a human operator, by the actuator of the pedal actuation assembly, etc.) to a pedal. The force transfer mechanism preferably includes a monitoring sensor (e.g., a force sensor) that communicates the force applied to the pedal (e.g., by the actuator, by a human operator) to a computing system (e.g., in a similar manner as other components of the sensor subsystem). The release mechanism functions to physically transition the pedal actuation assembly from the engaged configuration (e.g., in actuatable physical contact with pedals of the vehicle) to the disengaged configuration (e.g., out of physical contact with the pedals of the vehicle); the release mechanism can be actuated by a human driver (e.g., by way of a release switch), a remote operator, an autonomous control system, or any other suitable entity. However, the pedal actuation assembly can have any other suitable components that have any suitable functionality directed to pedal actuation.

3.6 Training Module

Figure 4:
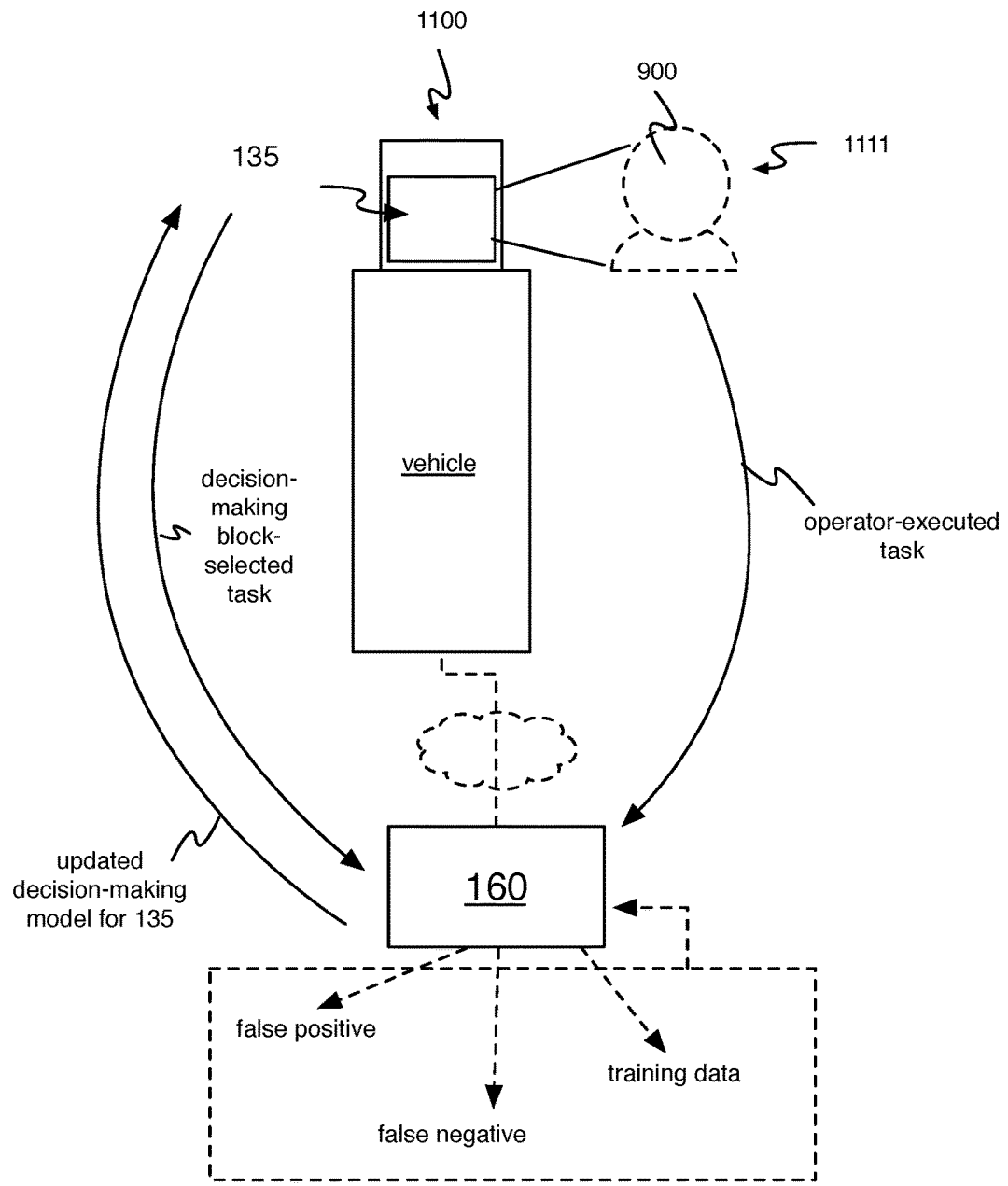
FIG. 4 is a flow chart of a specific example of a portion of a method of use of a variation of the vehicle control system.

As shown in FIG. 4, the training module 160 functions to generate training data usable to train models implemented by the decision-making block. The training module can additionally function to verify false-positive outputs and false-negative outputs of the decision-making block, and to train the decision-making block (e.g., modify parameters, properties, and other features of the decision-making block to reduce the number of false-positive and/or false-negative outputs). Inputs to the training module can include driver behavior (e.g., actions of a local operator, actions of a teleoperator), sensor data (e.g., received from the sensor subsystem), and any other suitable inputs from any other suitable components of the system or related entities. The training module can also receive the output of the decision-making block (e.g., a selected task block, a set of weight parameters for provision to a selected task block, etc.). The output of the training module preferably includes training data that can be utilized to modify a model or models implemented by the decision-making block. In a first variation, the training module correlates sensor data recorded on-board the vehicle (e.g., by the sensor subsystem) and driver behavior, in order to compare driver behavior in response to driving conditions with outputs of the decision-making block in response to sensor data. Such correlation can include determining a false negative (e.g., a decision-making block decision that did not recognize an event that led to an intervention by the driver), determining a false positive (e.g., the decision-making block determined that a driver intervention was necessary and the driver did not intervene), or making any other suitable determination.

Figure 3:
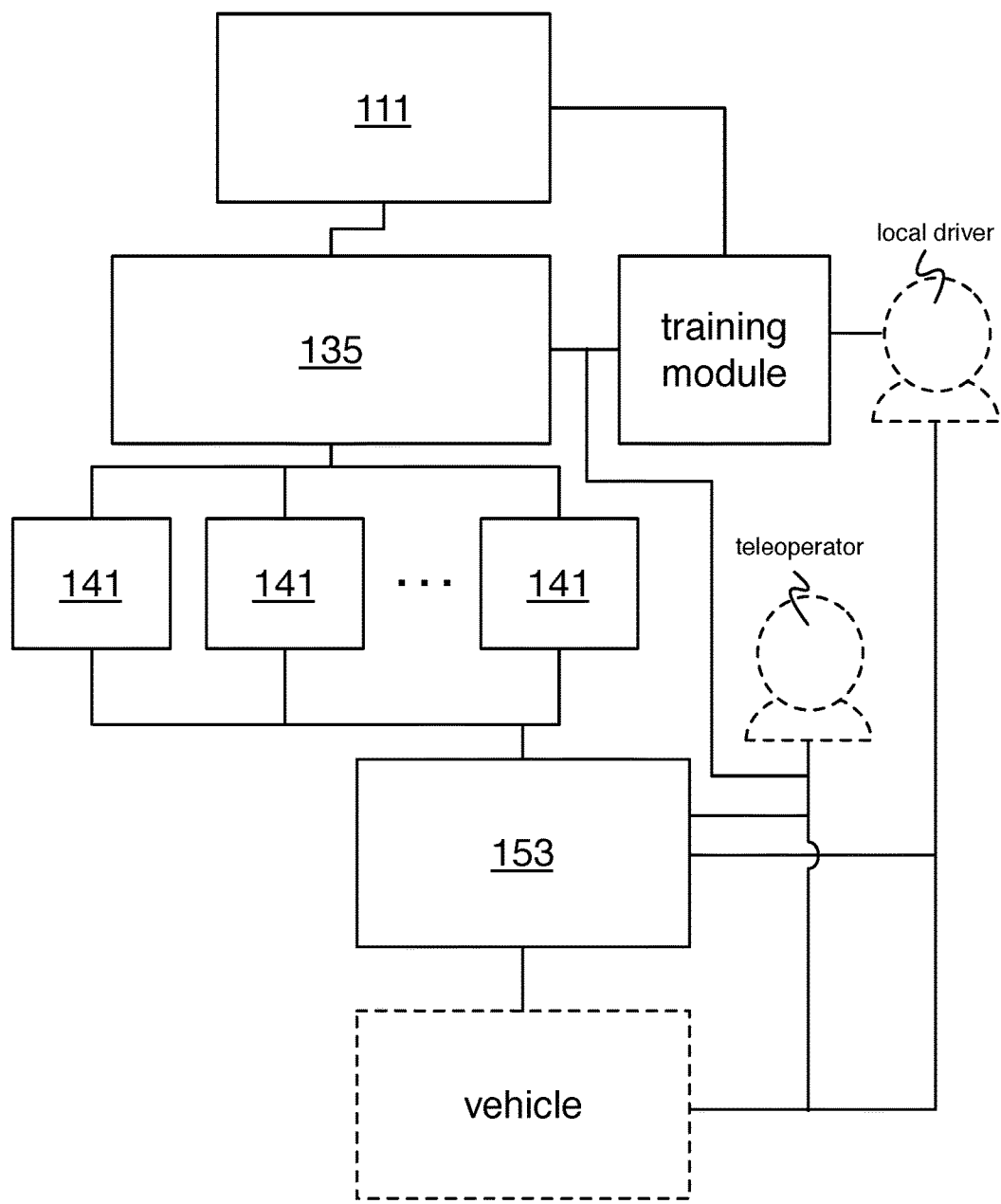
FIG. 3 is a schematic of an embodiment of a variation of the vehicle control system.

In one variation, the training module 160 receives the cost map 1102 and the traffic data 1103 from the perception module 110, and receives driver input (e.g., direct steering input from a local driver as shown in FIG. 3, remote speed input from a connected teleoperator, etc.) from a vehicle operator, and trains the behavior planning module based on the driver input, the cost map, and the traffic data. In an example, the driver input can include preemptively slowing the vehicle to produce a greater distance between the vehicle and a second vehicle driving ahead of the vehicle, in response to the vehicle operator noting erratic acceleration and deceleration behavior associated with the second vehicle. In this example, the training module can associate the states of the cost map 1102 and the traffic data 1103, extracted from the time period that the vehicle operator noted this behavior and provided the driver input, with the driver input; the training module can subsequently train the decision-making block based on these associated states and behaviors, and other similarly collected and associated states and behaviors, such that the decision-making block can automatically preemptively slow the vehicle in response to similar scenarios (e.g., implement supervised learning). However, the training module 160 can otherwise suitably train the decision-making block and/or module(s)/block(s) of the system 100.

3.7 Communication Module

The system can optionally include a communication module 170, which functions to communicatively couple the vehicle control system to a remote computing system (e.g., a teleoperation system). The communication module preferably includes a two-way wireless data link (e.g., 3G radio, 4G radio, 5G radios), but can additionally or alternatively include any other suitable data communication mechanism. The communication module is preferably integrated into the vehicle, but can additionally or alternatively be integrated into a mobile device associated with the vehicle and/or an occupant of the vehicle, traveling with the vehicle, or any other suitable mobile device. The communication module can receive various inputs, including transmissions sent to the vehicle (e.g., teleoperating instructions, GPS transponder or satellite signals, etc.), data to be transmitted away from the vehicle (e.g., sensor data, communications from a local operator designated for an entity remote from the vehicle, etc.), or any other suitable inputs. The communication module preferably transmits messages as outputs; such messages can include communications (e.g., radio communications), monitoring data (e.g., data collected by monitoring sensors of the sensor subsystem, data indicative of vehicular state or behavior, etc.), and any other suitable message data. The communication module can additionally or alternatively generate and/or provide other suitable outputs.

The communication module can include a remote teleoperation interface 171, which can include a display and a set of inputs. In one variation, the sensor data 1100 is transmitted to the remote teleoperation interface 171 and rendered at the display to a remote vehicle operator. In this variation, the system can receive driver input from the remote vehicle operator at the set of inputs (e.g., a connected replica steering wheel, an adapted game console controller, a mouse, a connected replica gas/brake/clutch pedal, etc.). In a related variation, the display is configured to visually simulate the interior of a commercial truck cabin (e.g., a semi-truck cabin, a semi-tractor cabin, a lorry cabin, etc.). In another related variation, the set of inputs includes a steering wheel input, a gas pedal input, a brake pedal input, and a transmission input, wherein each of the aforementioned inputs are configured as distinct inputs. However, the remote teleoperation interface 171 can be otherwise suitably configured.

4. Method of System Use

Figure 8:
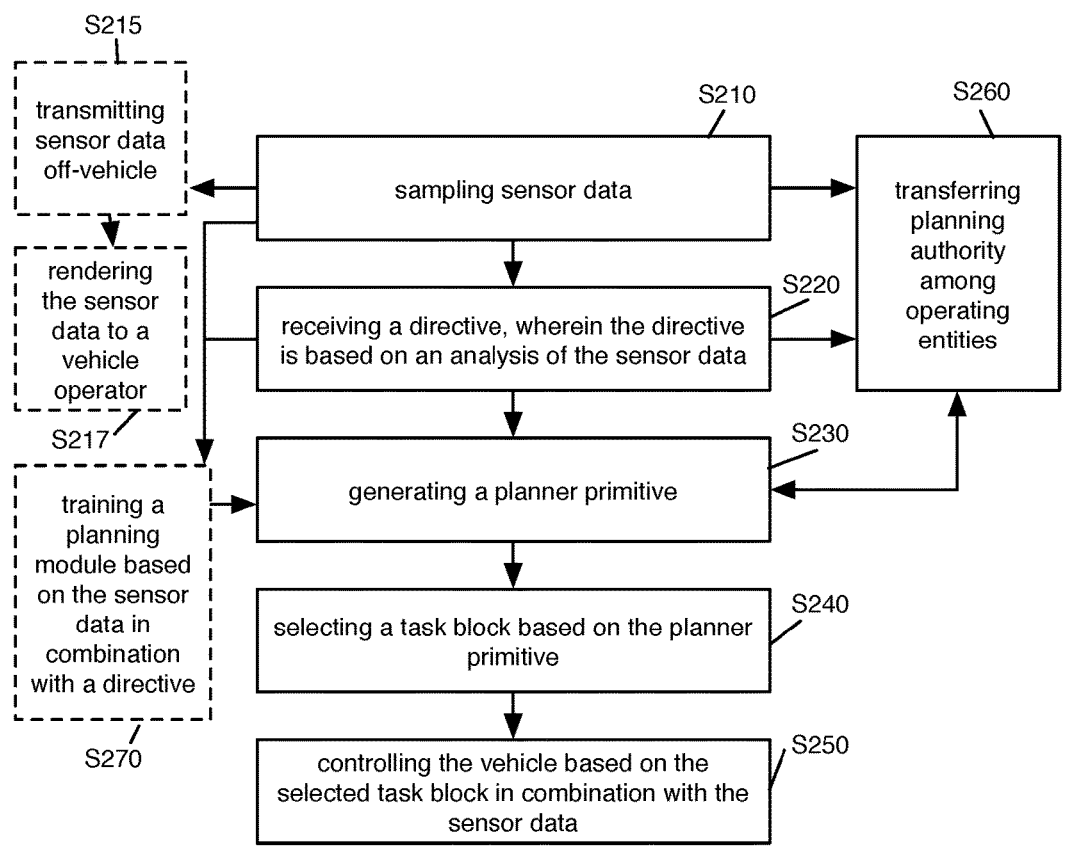
FIG. 8 is a flowchart of an example implementation of the method of use of the vehicle control system.

As shown in FIG. 8, the method 200 includes: sampling sensor data S210; receiving a directive, wherein the directive is based on an analysis of the sensor data S220; generating a planner primitive S230; selecting a task block based on the planner primitive S240; controlling the vehicle based on the selected task block in combination with the sensor data S250; and transferring planning authority among operating entities S260. The method 200 can optionally include transmitting the sensor data off-vehicle S215; rendering the sensor data to a vehicle operator S217; and training a planning module based on the sensor data in combination with a directive S270.

The method 200 is preferably implemented at, by, and/or by use of a system substantially identical to the system 100 described above in Section 3. However, the method 200 can additionally or alternatively be implemented at, by, and/or by use of any suitable system for autonomously, semi-autonomously, or manually controlling a vehicle.

Block S210 includes: sampling sensor data, which functions to gather sensor data from one or more sensors of the vehicle control system. The sensors preferably include image sensors, range finding sensors, and other sensors substantially as described above in Section 1, but can additionally or alternatively include any suitable sensors. In a first variation, the sensor data includes an image stream (e.g., a sequence of imagers, a video, etc.), a localization signal (e.g., a GPS location), and operational data (e.g., vehicle speed, vehicle fuel or energy level, vehicle internal temperature, external environmental temperature, tire inflation pressures for each tire, etc.).

In a first variation, Block S210 includes continuously sampling sensor data (e.g., at a sensor subsystem of the vehicle) that includes an image stream, a localization signal, and operational data. The sensor data can include any of the data described above in relation to the sensor data 1100 of the system 100, and/or any other suitable sensor data. Operational data can include any data related to operation of the vehicle, such as the current vehicle speed, current vehicle steering angle, current throttle status, instantaneous estimated vehicle range, and any other suitable data.

The method 200 can optionally include Block S215, which includes: transmitting the sensor data off-vehicle, which functions to provide the sensor data to an operating entity of the vehicle that is also located off-vehicle (e.g., a remote teleoperator). Block S215 can also function to log the sensor data collected during vehicle operation for subsequent analysis (e.g., training via Block S270, record collection, etc.). In a first variation, Block S215 includes transmitting the image stream, the localization data, and the operational data to a remote teleoperation interface (e.g., similar to the remote teleoperation database 171) associated with a teleoperator.

The method can optionally include Block S217, which includes: rendering the sensor data to a vehicle operator, which functions to provide vehicle telemetry to a vehicle operator. In one variation Block S217 includes rendering the sensor data (e.g., operational data, traffic data, etc.) at the remote teleoperation interface, wherein the remote teleoperation interface is configured to visually simulate the interior of a commercial trucking cabin.

Block S220 includes: receiving a directive, wherein the directive is based on an analysis of the sensor data, which functions to interpret the sensor data and provide a course of action for the vehicle based on the interpretation of the sensor data. The directive is preferably a semantic instruction (e.g., a directive to change lanes, a directive to exit a highway, a directive to slow and stop at the side of the roadway when sufficient space is available, etc.), but can additionally or alternatively include a binary instruction (e.g., emergency stop vs. continue operating), a direct control input (e.g., movement of the steering wheel, actuation of the brake or gas pedal, changing of the transmission gear, etc.), an indirect control input (e.g., movement of a remotely-connected steering-wheel controller, actuation of a remotely-connected pedal controller, etc.), and/or any other suitable instruction or similar input related to vehicle operation.

In one variation, Block S220 includes receiving, at a behavior planning module of the vehicle, a first directive from the teleoperator by way of the remote teleoperation interface, wherein the behavior planning module consists essentially of a trained machine-learning module. In a related variation, Block S220 includes receiving a second directive from the teleoperator, in response to the vehicle entering a geographic region having a predetermined characteristic. In examples, the geographic region having the predetermined characteristic can include an end region of a highway on-ramp (e.g., the teleoperator can transmit a directive to enter fully-autonomous mode after reaching the end of the on-ramp).

Block S230 includes: generating a planner primitive, which functions to provide a high-level description (e.g., a semantic description) of the specific actions to be taken in navigating the vehicle according to the directive. Block S230 can include generating the planner primitive based on a directive. For example, the directive can include a directive to change lanes, and Block S230 can include generating a planner primitive to enter a lane-change task block and a set of criteria that should be met before initiating the lane change (e.g., an integrated cost threshold based on the cost map, a timeout limit, etc.). Block S230 can include automatically generating the planner primitive. For example, Block S230 can include automatically generating a planner primitive at a behavior planning module of the vehicle based on the received sensor data (e.g., operating substantially and/or completely autonomously).

Block S240 includes: selecting a task block based on the planner primitive, which functions to choose a task block (e.g., representative of a desired vehicle action) based on the instruction associated with the planner primitive (e.g., instructions to perform an action and/or set or series of actions). Block S240 can be performed in response to a directive, and/or automatically, or otherwise suitably performed.

In one variation, Block S240 includes selecting, at a local planning module of the vehicle, a task block based on the planner primitive, wherein the task block consists essentially of an explicitly programmed set of rules.

Block S250 includes: controlling the vehicle based on the selected task block in combination with the sensor data, which functions to provide low level instructions to actuators of the vehicle control system to physically control the vehicle, based on sensor data and the instructions codified by the selected task block.

Block S260 includes: transferring planning authority among operating entities, which functions to hand over vehicle control between various entities that can exert control over vehicle operation. Such operating entities can include a computing system (e.g., a behavior planning module at the vehicle, a behavior planning module remote from the vehicle), a remote vehicle operator (e.g., a teleoperator), and in some cases a local operator (e.g., a driver located in the vehicle), as well as any other suitable human and/or machine operator of the vehicle. Planning authority preferably includes decision making (e.g., such as decision making performed by a decision-making block of the vehicle control system). Transferred planning authority can, in some variations, include direct control over actuation elements (e.g., a steering actuator, a pedal actuator), but can alternatively include only decision-making control wherein direct control is performed via systems residing at the vehicle (e.g., a local planning module, a control module, etc.).

In one variation, Block S260 can be performed based on receiving a directive (e.g., an instance or example of Block S220); for example, the directive can include an instruction to transfer planning authority from a behavior planning module residing at the vehicle to a teleoperator located remotely, and Block S260 can accordingly include transferring planning authority to the teleoperator from the behavior planning module. The directive can be received from (e.g., manually triggered by) an operator (e.g., teleoperator, local operator in the vehicle), or from any other suitable source. In another example, Block S260 can include transferring planning authority to the behavior planning module of the vehicle, in response to receiving the second directive, wherein the second directive is received from the teleoperator, in response to the vehicle entering a geographic region having a predetermined characteristic.

In another variation, Block S260 can be performed automatically, in response to a predetermined condition being met. For example, Block S260 can include transferring planning authority to a teleoperator in response to the vehicle reaching a predetermined geographic location (e.g., a highway exit along the route determined by the mission planning module, a highway off-ramp, etc.). In another example, Block S260 can include transferring planning authority from the teleoperator to the behavior planning module (e.g., residing at the vehicle) in response to the vehicle entering a stable speed condition on a highway after merging from an on-ramp thereof. In another example, Block S260 can include transferring planning authority to an operator (e.g., local operator residing in the vehicle, teleoperator, etc.) in response to an emergency-takeover switch or button being activated by the local operator (e.g., receiving a directive from a local operator) or an emergency event (e.g., failure event) detected from the sensor data.

The method can include Block S270 which includes: training a module based on the sensor data in combination with a directive, which functions to train a machine-learning module of the vehicle control system. Training is preferably performed via supervised learning, but can additionally or alternatively be performed via unsupervised learning and/or any one or more of the machine-learning techniques described above in Section 3. In a specific example, Block S270 can include training a behavior planning module (e.g., a decision-making block of the behavior planning module) based on direct control inputs provided at an actuation subsystem of the vehicle by a local operator (e.g., a driver located in the vehicle) in combination with sensor data (e.g., image and rangefinding data) to train the behavior planning module to take the same actions with regard to controlling the vehicle as the local operator does when presented with a traffic situation corresponding to the sensor data.

Figure 7:
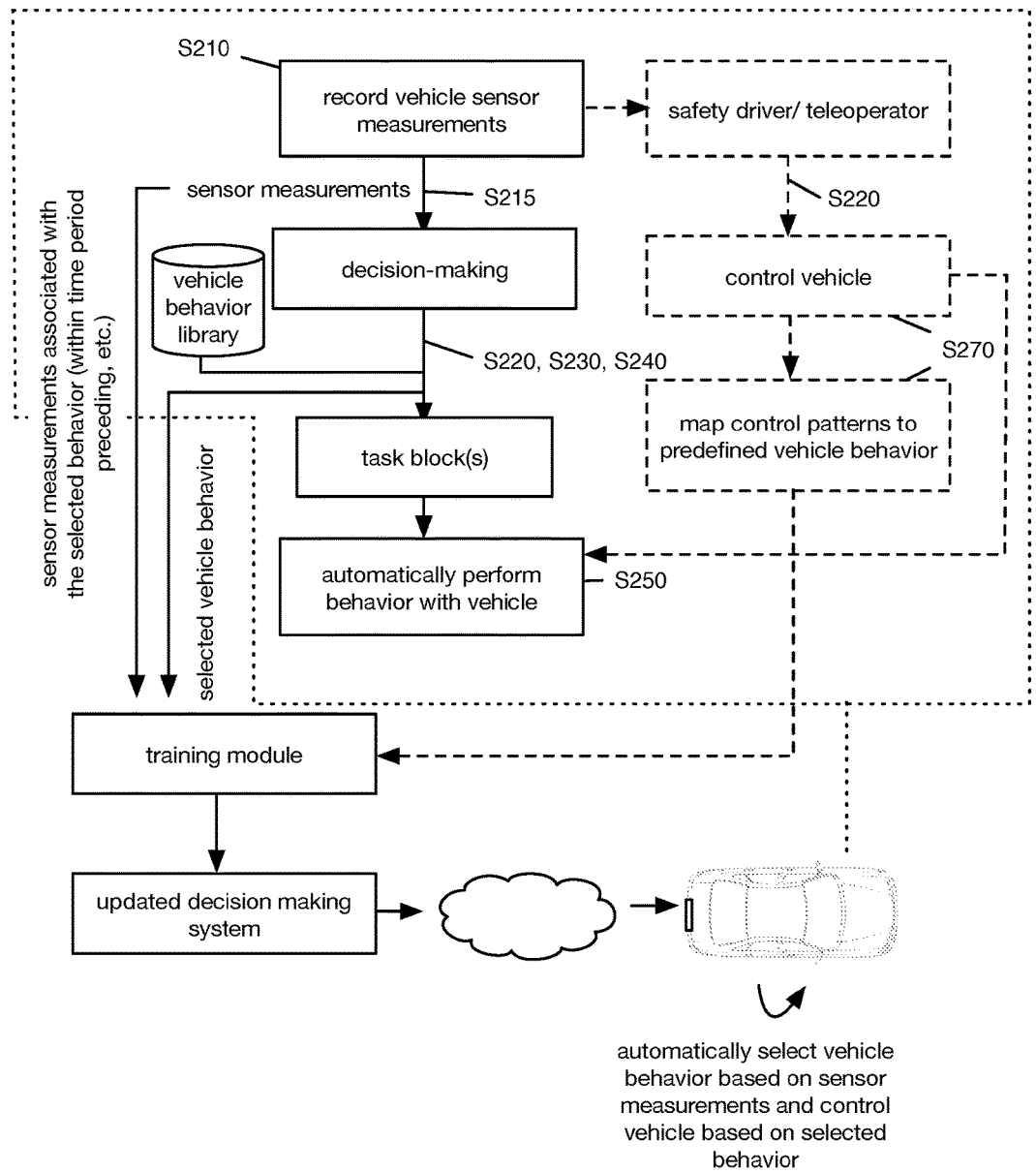
FIG. 7 is schematic of a specific example of the vehicle control system and method of use.

In a first example of the method 200, as shown in FIG. 7, the decision-making block of the behavior planning module (e.g., on board the vehicle, remote from the vehicle, etc.) can select a vehicle action and present the selected action to a teleoperator. The vehicle action can be subsequently performed in response to teleoperator approval of the selected action. Additionally or alternatively, the teleoperator can utilize a software switch that transmits a signal to the vehicle to transition out of the autonomous mode after the teleoperator has assumed control of the vehicle.

In a second example of vehicle control system use (e.g., a method of use of the system), all or some of the measurements by the sensor subsystem (e.g., a low-resolution sensor stream) can be sent to a remote teleoperator, which monitors the sensor streams and can (in some variants) override and/or preempt the decision-making block (e.g., in cases where the decision-making block has already determined or is determining a task block) by selecting a vehicle action (e.g., behavior) from a set of available vehicle actions (e.g., codified by task blocks). The decision-making block can be determined using the first example of the method, or be otherwise determined. The selected vehicle action (e.g., instructions or identifier thereof) can then be transmitted to the vehicle, wherein the vehicle performs the teleoperator-selected vehicle action (e.g., using the actuation subsystem). In cases where the decision-making block-selected vehicle behavior (e.g., task) conflicts with the teleoperator-selected vehicle behavior, the teleoperator-selected vehicle behavior is preferably given preference (e.g., execution preference), but the decision-making block-selected vehicle behavior can alternatively be given preference.

In another example of the method of use, a local driver (e.g., a human vehicle operator) can be located within the vehicle (e.g., in a driver's seat position of a vehicle cabin) and have the same operating authority and capabilities as a teleoperator. The local driver's commands preferably supersede the teleoperator's commands, which supersede the decision-making block commands, but the commands can be prioritized in any other suitable order.

In other examples of the method of use, as shown in FIGS. 2 and 5, the training module can monitor the teleoperator and/or local driver instructions (e.g., selections of task blocks by the teleoperator) and the underlying data (e.g., sensor data collected by the sensor subsystem over a time period preceding the teleoperator selection), and train the decision-making block based on the teleoperator selections and underlying data (e.g., using an artificial neural network, a stochastic machine-learning model, etc.). The trained (e.g., updated, modified, etc.) decision-making block can subsequently be supplied to the vehicle (e.g., at a predetermined frequency, when an update condition is met, etc.), and the training process can be repeated. Selections by a local driver can be treated similarly to the teleoperator instructions by the training module, but can be otherwise treated.

In another specific example of system use, the sensor subsystem collects sensor data as inputs and provides the sensor data to the behavior planning module as outputs. The sensor data includes image data collected from one or more outward-facing cameras of the vehicle, as well as point cloud data form one or more rangefinding sensors of the vehicle. The decision-making block processes the sensor data according to a set of rules (e.g., implemented as a convolutional neural network), and produces a task selection as an output. The task selection can include one or more vehicle operation tasks (e.g., slow down, change lanes, shift gears, etc.) that the decision-making block determines should be performed by the vehicle. Based on the task selection, the decision-making block activates one or more task blocks corresponding to the task selection. The activated task blocks then execute predetermined instructions to control the actuation subsystem to actuate the vehicle and perform the selected tasks (e.g., depress the brake pedal or downshift to slow down, rotate the steering wheel to change lanes, etc.).

In some variations and examples, control of the vehicle can be transferred between the vehicle control system, a teleoperator, and/or a local driver (e.g., driver located within the vehicle). Transfers can be initiated and/or triggered based on events. Events that can trigger control transfer include: measurement of a specific set or pattern of vehicle parameter values associated with a vehicle action or behavior (e.g., accelerometer data indicating a swerve or skid), manual activation of a mode-transfer switch (e.g., an operator hitting an emergency stop button), contextual events (e.g., location, such as proximity to a highway exit en route; time of day; the driver profile; whether the vehicle is on the highway; etc.), or any other suitable trigger events. Trigger events can be determined from GPS and/or map data, images from an internally- or externally-facing camera and/or analysis thereof, accelerometer and/or IMU data, and any other suitable sensor data and/or processed data. In a first example, the system includes an emergency-stop button attached to the steering wheel, which gives full control of the vehicle to the local operator when depressed (e.g., actuatable control authority is removed from the decision-making block and/or the teleoperator). In another example, an emergency-stop foot pedal is attached to the pedal actuation assembly of the actuation subsystem, and depressing the emergency-stop pedal gives full control of the vehicle to the local operator and physically disengages the actuator of the pedal actuation assembly from the vehicle control pedals. In another example, the steering actuation assembly automatically disengages upon detecting a threshold opposing torque (e.g., exerted by a local driver against the drive motor of the steering actuation assembly) and transfers control of the vehicle to the local operator. In another example, the system includes an autonomous ON/OFF switch that can be used by the teleoperator to switch control of the vehicle between the teleoperator and the vehicle control system (e.g., operating in the autonomous driving mode). In another example, the system includes a toggle switch actuatable by the local operator to switch between in-seat (e.g., wherein the local operator is in the driver's seat of the vehicle) and out-of-seat (e.g., wherein the local operator is within the vehicle but not in the driver's seat) vehicle operation modes. However, control of the vehicle can be otherwise suitably transferred between any other suitable operators and/or entities.

In another example of a portion of the method of use, the local operator can view a touch-sensitive display of the system that includes different visual indicators (e.g., color codes) displayed to the local operator (e.g., Green: ok, Yellow: cautious, and Red: takeover), wherein the system also includes an audio alert (e.g., a buzzer) that activates prior to the changes in the visual indicator. In this example, there is a countdown rendered on the screen (e.g., a five second countdown) when the visual indicator has changed to indicate the local operator should take command of the vehicle. After the countdown has completed, if the local operator has not assumed control of the vehicle, the vehicle control system can control the vehicle to decelerate and pull to the shoulder at the first available opportunity.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller 430. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and/or method blocks.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

What is claimed is:

1. A system for controlling a vehicle navigating a roadway, comprising:
    a perception module comprising a sensor subsystem, wherein the sensor subsystem generates sensor data, and wherein the perception module outputs a cost map of the area proximal the vehicle, and traffic data associated with traffic objects proximal the vehicle based on an analysis of the sensor data;
    a behavior planning module that receives the cost map and the traffic data from the perception module and generates planner primitives based on the cost map and traffic data, wherein the behavior planning module comprises a decision-making block that consists essentially of a trained machine-learning model;
    a training module that receives the cost map and the traffic data from the perception module, receives driver input from a vehicle operator, and trains the behavior planning module based on the driver input, the cost map, and the traffic data;
    a local planning module comprising a set of task blocks, each of the set of task blocks consisting essentially of an explicitly-programmed set of rules, wherein the local planning module receives the cost map from the perception module and the planner primitives from the behavior planning module, selects a task block based on the planner primitives, and uses the selected task block to generate control commands based on the cost map; and
    a control module comprising an actuation subsystem, wherein the control module receives the control commands from the local planning module and controls the actuation subsystem based on the control commands.

2. The system of claim 1, wherein the sensor data comprises image data and range data corresponding to the environment surrounding the vehicle.

3. The system of claim 1, wherein the traffic data comprises at least one of a set of positions and a set of trajectories, the set of positions and the set of trajectories associated with a set of traffic objects classified by an object analysis block of the perception module.

4. The system of claim 3, wherein the set of traffic objects comprises at least one of a neighboring vehicle, a lane marking, and a roadway edge.

5. The system of claim 1, wherein the perception module outputs a geographic location of the vehicle, and further comprising a mission planning module that receives the geographic location from the perception module and generates a route plan based on the geographic location and a predetermined destination, wherein the behavior planning module receives the route plan from the mission planning module and generates the planner primitives based on the route plan in combination with the cost map and traffic data.

6. The system of claim 1, wherein the perception module comprises:
    a cost mapping block that generates the cost map based on an analysis of the sensor data, wherein the cost map comprises a two-dimensional mapping of a set of weights to an associated set of positions on the roadway, wherein each weight corresponds to a risk value of occurrence of an adverse event were the vehicle to be located at the associated position, and
    at least one of a lane identification block, a lane tracking block, an object identification block, and an object tracking block.

7. The system of claim 1, further comprising a prediction block that estimates future positions of traffic objects relative to the vehicle, based on computed trajectories of the traffic objects and the traffic data, and wherein the behavior module generates planner primitives based on the estimated future positions of traffic objects.

8. The system of claim 1, further comprising a finite-state automator that selects a subset of allowed planner primitives from a set of planner primitives, based on the cost map and traffic data.

9. The system of claim 8, wherein the subset of allowed planner primitives excludes a lane-change primitive, based on traffic data indicative that the roadway is a single-lane roadway.

10. The system of claim 1, wherein the vehicle operator is a remote vehicle operator residing outside the vehicle, further comprising a remote teleoperation interface, comprising a display and a set of inputs, that renders the sensor data to the remote vehicle operator at the display and receives the driver input from the remote vehicle operator at the set of inputs, wherein the set of inputs comprises a steering wheel input, a gas pedal input, a brake pedal input, and a transmission input.

11. The system of claim 10, wherein the system is operable between a teleoperation mode and an autonomous mode, wherein in the teleoperation mode, the behavior planning module generates the planner primitives based on a directive received from the remote vehicle operator; wherein in the autonomous mode, the behavior planning module generates the planner primitives at the decision-making block independently of the remote vehicle operator; and wherein the system transitions between the teleoperation mode and the autonomous mode based on a geographic location of the vehicle.

12. The system of claim 1, wherein the control module further comprises a speed control block and a steering control block, wherein the speed control block outputs a throttle actuator position and a brake actuator position based on the command instructions associated with the selected task block, and wherein the steering control block outputs a steering angle based on the command instructions associated with the selected task block.

13. A method for controlling a vehicle, comprising:
continuously sampling, at a sensor subsystem of the vehicle, sensor data comprising an image stream, a localization signal, and operational data;
transmitting the image stream, the localization signal, and the operational data to a remote teleoperation interface associated with a teleoperator;
receiving, at a behavior planning module of the vehicle, a first directive from the teleoperator by way of the remote teleoperation interface, wherein the behavior planning module consists essentially of a trained machine-learning module;
generating a planner primitive at the behavior planning module based on the directive;
selecting, at a local planning module of the vehicle, a task block based on the planner primitive, wherein the task block consists essentially of an explicitly programmed set of rules;
controlling the vehicle, at a control module of the vehicle, based on the selected task block in combination with the sensor data;
receiving a second directive from the teleoperator, in response to the vehicle entering a geographic region having a predetermined characteristic;
transferring planning authority to the behavior planning module of the vehicle, in response to receiving the second directive;
automatically generating a second planner primitive at the behavior planning module based on the sensor data;
automatically selecting a second task block, based on the second planner primitive;
controlling the vehicle based on the selected second task block in combination with the sensor data; and
automatically transferring planning authority to the teleoperator, in response to the vehicle reaching a predetermined geographic location.

14. The method of claim 13, wherein the operational data comprises at least one of the current vehicle speed, current vehicle steering angle, current throttle status, and instantaneous estimated vehicle range.

15. The method of claim 14, further comprising rendering the operational data at the remote teleoperation interface, wherein the remote teleoperation interface is configured to visually simulate the interior of a commercial trucking cabin.

16. The method of claim 13, further comprising training the behavior planning module based on the first directive in combination with the sensor data.

17. The method of claim 13, wherein the geographic region having the predetermined characteristic comprises an end region of a highway on-ramp, and wherein the predetermined geographic location comprises a highway off-ramp.

18. The method of claim 13, wherein the first directive comprises a directive to change lanes to the left, wherein the planner primitive comprises a left-lane-change primitive, wherein the task block comprises a left-lane-change block, and wherein controlling the vehicle comprises generating steering angle instructions, throttling instructions, and braking instructions corresponding to a lane change to a lane at a left side of the vehicle, based on the sensor data and a set of rules of the left-lane-change block, and actuating a steering wheel, gas pedal, and brake pedal of the vehicle according to the respective steering angle instructions, throttling instructions, and braking instructions.

19. The method of claim 13, further comprising receiving a third directive from a local operator residing inside the vehicle, transferring planning authority to the local operator in response to receiving the third directive, and controlling the vehicle based on direct control inputs generated by the local operator.

20. The method of claim 19, further comprising training the behavior planning module based on the direct control inputs in combination with the sensor data.

* * * * *